United States Patent
Kottapalli

(10) Patent No.: US 7,149,880 B2
(45) Date of Patent: Dec. 12, 2006

(54) METHOD AND APPARATUS FOR INSTRUCTION POINTER STORAGE ELEMENT CONFIGURATION IN A SIMULTANEOUS MULTITHREADED PROCESSOR

(75) Inventor: Sailesh Kottapalli, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 09/753,764

(22) Filed: Dec. 29, 2000

(65) Prior Publication Data

US 2002/0087843 A1    Jul. 4, 2002

(51) Int. Cl.
*G06F 9/30*    (2006.01)

(52) U.S. Cl. ..................................... 712/214

(58) Field of Classification Search ................ 712/228, 712/214; 718/107, 108
See application file for complete search history.

(56) References Cited

U.S. PATENT DOCUMENTS

| | | | | |
|---|---|---|---|---|
| 5,907,702 A | * | 5/1999 | Flynn et al. | 718/108 |
| 5,933,627 A | * | 8/1999 | Parady | 712/228 |

* cited by examiner

*Primary Examiner*—Eddie Chan
*Assistant Examiner*—David J. Huisman
(74) *Attorney, Agent, or Firm*—Kenyon & Kenyon

(57) ABSTRACT

A system and method for a simultaneous multithreaded processor that reduces the number of hardware components necessary as well as the complexity of design over current systems is disclosed. As opposed to requiring individual storage elements for saving instruction pointer information for each re-steer logic component within a processor pipeline, the present invention allows for instruction pointer information of an inactive thread to be stored in a single, 'inactive thread' storage element until the thread becomes active again.

22 Claims, 4 Drawing Sheets

MULTIPLEXER PRIORITY: 1 - DEBUG/DFT IP  2 - EXCEPTION/FAULT RE-STEER  3 - BRANCH MISPREDICT RE-STEER
4 - '1' BUBBLE BRANCH RE-STEER  5 - '0' BUBBLE BRANCH RE-STEER  6 - SEQUENTIAL IP (IP+1)

METHOD AND APPARATUS FOR INSTRUCTION POINTER STORAGE ELEMENT CONFIGURATION IN A SIMULTANEOUS MULTITHREADED PROCESSOR

BACKGROUND INFORMATION

The present invention relates to processor design. More specifically, the present invention relates to a system that reduces the number of hardware components necessary for instruction pointer generation in a simultaneous multithreaded processor.

Multithreaded processors have become more and more popular in the art to minimize unproductive time spent by a processor. Multithreading enables a processor to perform tasks for a given thread until a specific event occurs, such as a certain number of execution cycles passing, a higher priority thread requiring attention, or the current thread being forced into a stall mode while waiting for data, and then beginning processing on another thread.

To facilitate multiple program threads being actively executed, simultaneous multithreaded (SMT) implementations require that multiple threads be fetched and readied for execution. Different methods exist in the art for fetching instructions from the various active threads. One approach is to utilize multiple 'front ends' to fetch and fill the decoupling buffers that feed the 'back end' execution pipes—one for each thread. This approach requires a large amount of hardware for the multiple front ends (which also include the level one instruction cache).

An alternate, more common, method of facilitating multithreading is to time-multiplex between various threads in a 'round-robin' fashion. FIG. 2 provides an illustration of simple instruction pointer logic utilizing such a method of time-multiplexing between two threads. A problem with this method is that, not only do the multiplexers 218, 220 need to be duplicated, but also multiple storage elements (flip flops) 248,250,252,254,256 need to be introduced. These storage elements (one for each re-steer logic path) are required to capture the re-steer information (for re-direction to point to the proper instruction) on the inactive thread. Without them, the re-steer information would be lost during inactivity of the thread. Further, with this method of SMT, the number of inputs to each multiplexer 218,220 doubles. The additional inputs make the multiplexers 218,220 larger and exacerbate the critical timing path, which is already constrained by the addition of a next level multiplexer 246 to select between the multiple threads.

It is therefore desirable to have a system for a simultaneous multithreaded processor that minimizes the number of hardware components necessary as well as the complexity of design.

DETAILED DESCRIPTION

Figure 1:
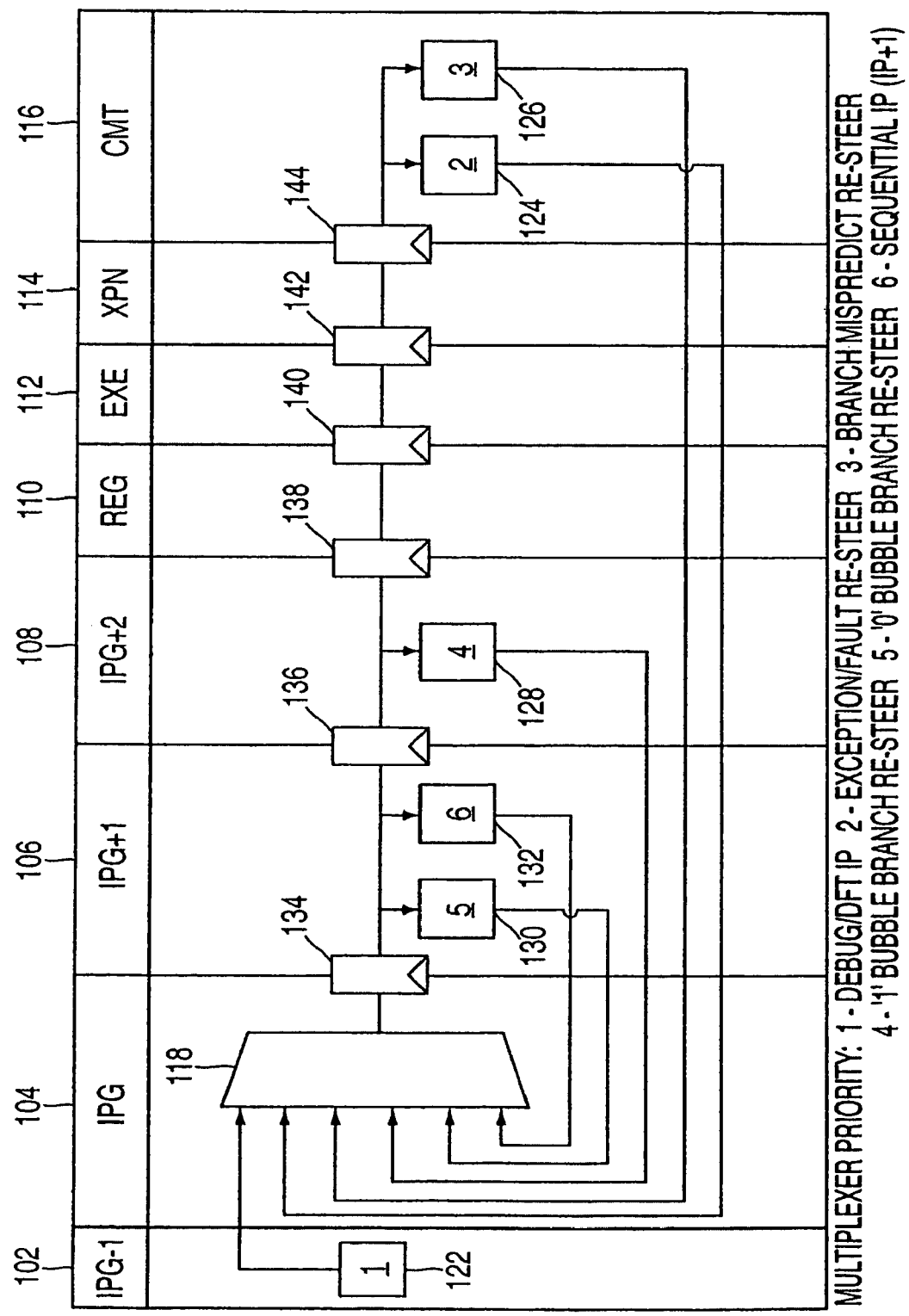
FIG. 1 illustrates how a typical processor utilizing pipelining methodology operates with regards to instruction pointer generation.

A system and method are disclosed for a simultaneous multithreaded processor that reduces the number of hardware components necessary as well as the complexity of design over current systems of multithreaded processors. As stated previously, prior systems require a storage element 248,250,252,254,256 for each re-steer logic path back to the multiplexers in order to save branch prediction re-steer (instruction pointer) information of the inactive thread. (See FIG. 2) Further, the number of inputs to each multiplexer needs to be doubled as compared to a non-multithreaded design. For each necessary input, there is a direct (live) feed 260 and a pre-recorded data path (from the storage element) 258.

In an embodiment of the present invention, instruction pointer information of the inactive thread is saved in a storage element 348,350 (FIG. 3) located after the respective multiplexer 318,320, in order to store the re-steer information no matter from what source it came (no matter from which re-steer logic it came) 322,324,326,328,330,332. When the inactive thread once again becomes active, the instruction pointer is fed back into the multiplexer 318,320 (as an 'inactive thread re-steer'), through the common multiplexer 346, and on to the processor pipeline.

FIG. 1 illustrates how a typical processor utilizing pipelining methodology operates with regards to instruction pointer generation. Pipelining organizes instructions into a kind of assembly line process, where the microprocessor begins executing a second instruction before the first has been completed. That is, different instructions are in the pipeline simultaneously, each at a different processing stage. This is done to improve efficiency and to minimize unproductive time spent by the processor.

In the first stage, Instruction Pointer Generation-1 (IPG-1) 102, a pointer is provided for debug operations 122, such as 'design for testability' (DFT) operations. This instruction pointer path maintains the highest priority for the multiplexer 118. Therefore, this instruction pointer would preempt any other instructions received at the multiplexer simultaneously. The next stage in the processor pipeline, instruction pointer generation (IPG) 104, is the stage of the pipeline in which the various re-steers are presented to the multiplexer 118 for priority routing to the processor. All of the re-steer logic paths are fed into the multiplexer 118 with their associated multiplexer priority. The priority is denoted by the order of placement on the multiplexer—the higher the input location, the higher the priority. Also, the re-steer logic components 122,124,126,128,130,132 have been labeled 1–6 to denote their relative multiplexer priority. Basically, the priorities are determined by relative cycle time penalties related to each respective re-steer scenario. The more cycles that will be lost due to a given re-steer, the higher the priority of that re-steer path. For example, a '1' bubble branch re-steer 128 has a one cycle penalty (the one cycle previous to it must be flushed). Therefore, it has a greater priority than a '0' bubble branch re-steer 130, which does not have to flush a cycle. Also, sequential IP 132 is lowest in priority because a simple instruction pointer increment should not be performed unless it is assured that no re-steers need to be performed.

Before passing to the next stage of the processor pipeline, the instruction pointer passes through an IPG/IPG+1 staging storage element 134 to be held until the instruction pointer generation +1 (IPG+1) 106 stage is ready to accept the instruction pointer. Based on past history of logic decisions with regards to jumps to different address locations, the '0' bubble branch re-steer logic 130 decides whether there is a significant likelihood that upon execution, the processor will jump to a different (non-sequential) address. If the pipeline had been filled with successive instruction pointers for each successive pipeline stage, and a jump turns out to be necessary, the entire contents of the pipeline prior to that point would need to be flushed. By utilizing past history of logic decisions, it is possible to minimize the number of times the pipeline needs to be flushed.

Based on history, the '0' bubble re-steer logic 130 provides a new instruction pointer to the multiplexer 118 if necessary. This re-steer logic is called "0 bubble" because it has a zero cycle penalty. No stages of the pipeline have to be flushed. In contrast, a '1' bubble branch re-steer necessitates that the contents of IPG+1 106 be flushed. This is explained further in the following.

Within the IPG+1 stage of the processor pipeline, the instruction pointer is incremented at sequential IP (IP+1) 132 to move to the next address if necessary. Upon moving to the next stage of the processor pipeline, the instruction pointer passes through and may be held if necessary at the IPG+1/IPG+2 staging storage element 136 until the instruction pointer generation +2 (IPG+2) 108 stage can accept the instruction pointer. At this stage, '1' bubble branch re-steer logic 128 determines, based on history, whether a new instruction pointer should be supplied to the pipeline. After the IPG+2 stage, the instruction pointer may be held at the IPG+2/REG storage element 138, and then it is received in the register access (REG) stage 110. In the REG stage 110, data is read from the one or more registers to be processed. With the data of the registers, after the REG/EXE staging storage element 140, the required function (such as addition, subtraction, etc.) is performed on the data of the registers at the execute (EXE) stage 112.

After the EXE stage 112, the instruction pointer may be held in the EXE/XPN staging storage element 142, and then the exception detection (XPN) stage 114 is entered. In the XPN 114 stage, the processor makes sure that the instruction did not encounter an exception. The instruction pointer with associated data then passes through an XPN/CMT staging storage element 144 and then on to the commit CMT stage 116. In the CMT stage 116, if there were no exceptions encountered in the XPN stage 114, the register is updated with the resulting value. If there was an exception encountered in the XPN stage 114, exception/fault re-steer logic 124 is utilized to provide an instruction pointer for exception handling.

If it is determined at this stage by branch mispredict re-steer logic 126, that the address predicted in the '0' branch re-steer logic 130 or the '1' branch re-steer logic 128 was in fact wrong—that the following stages (to the left) were pre-loaded with incorrect instruction pointers, the processor pipeline is flushed and the branch mispredict re-steer logic 128 provides the correct instruction pointer back to the multiplexer 118.

Figure 2:
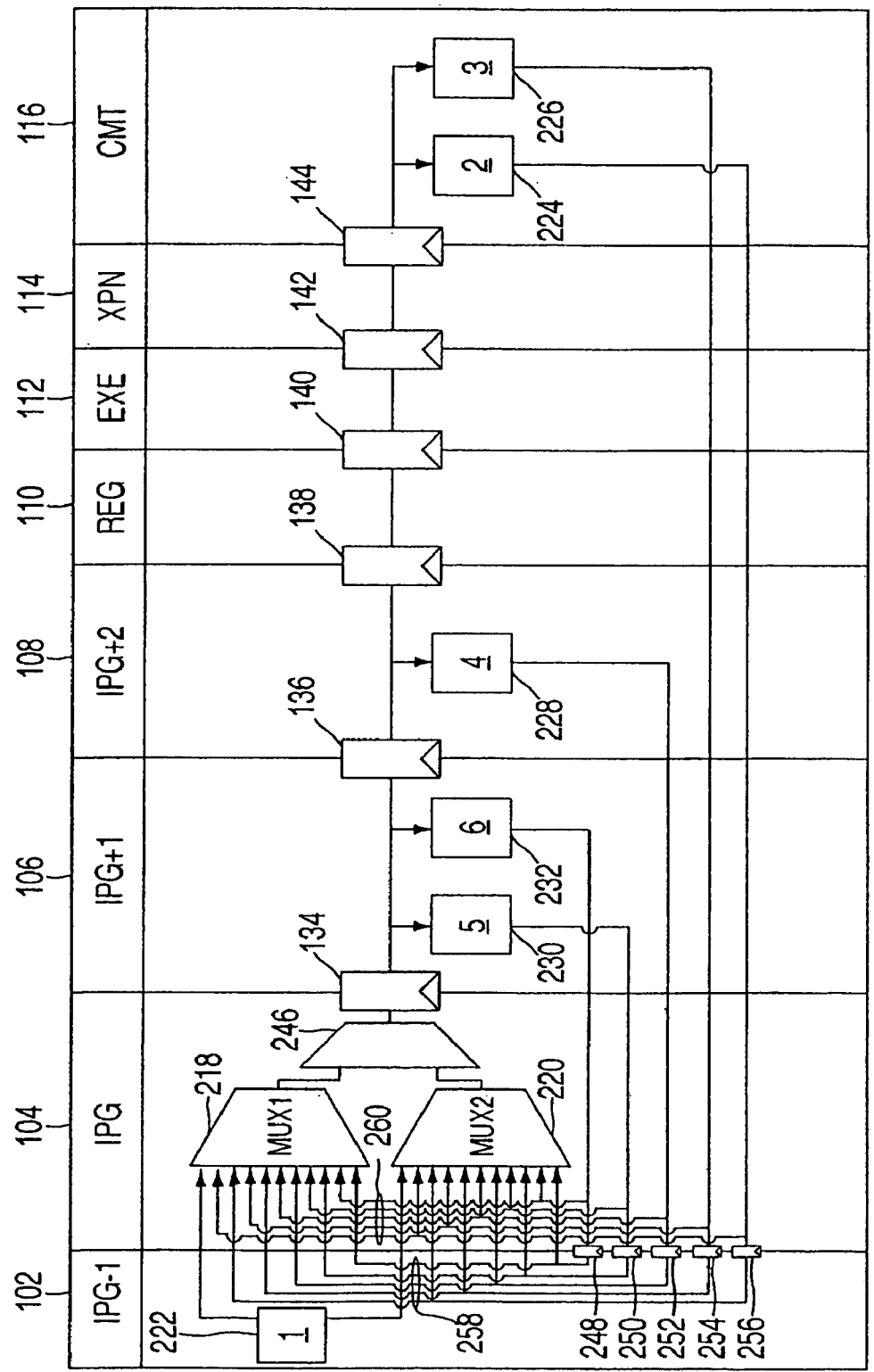
FIG. 2 illustrates the operation of instruction pointer generation of a typical simultaneous multithreaded processor that utilizes pipelining methodology.

FIG. 2 illustrates the operation of instruction pointer generation of a typical simultaneous multithreaded processor that utilizes pipelining methodology. In the IPG stage 104, a separate multiplexer 218, 220 is utilized for each thread being received by the processor. MUX1 218 is utilized for thread 1, and MUX2 220 is utilized for thread 2. A common multiplexer 246 switches between the two threads, depending upon which one is active. As compared to the single-thread, pipelined processor described in FIG. 1, the typical multi-thread version has twice as many inputs for each multiplexer 218,220. For each input necessary for a single-thread processor, there is one input for direct (live) feed 260 from the re-steer logic and one pre-recorded data path (from the associate storage element) 258.

For example, while thread 1 is active, re-steer information is fed from the different re-steer logic 222,224,226,228,230, 232 to MUX1 218 and is allowed by the common multiplexer 246 to pass to the processor pipeline. The common multiplexer 246 chooses between the different multiplexers 218,220 based on which one is active. During this operation, the re-steer information is fed to the multiplexer 218 directly from whichever re-steer logic 222,224,226,228,230,232 [260 collectively]. Because of the nature of pipelining, as the different threads change between active and inactive states, different stages within the pipeline can be processing different threads simultaneously.

While thread 1 is active and is being fed into the processor, thread 2 is inactive. Re-steer information necessary for thread 2 must be saved during the inactivity of thread 2 in order to prevent loss. Therefore, in a typical multithreaded processor, each re-steer logic component 224,226,228,230, 232 has a storage element 256,254,252,250,248 associated with it to save instruction pointer information. When thread 1 becomes inactive, because of an event such as a stall in waiting for another process' output or because of a predetermined number of clocks passing, thread 2 can then become active once again. MUX2 220 can then receive the pre-recorded re-steer information 258 to resume activity as if no interruption had occurred.

As stated previously, this system for a simultaneous multithreaded processor requires a large amount of hardware because of the individually utilized storage elements and a great complexity in the wiring design.

Figure 3:
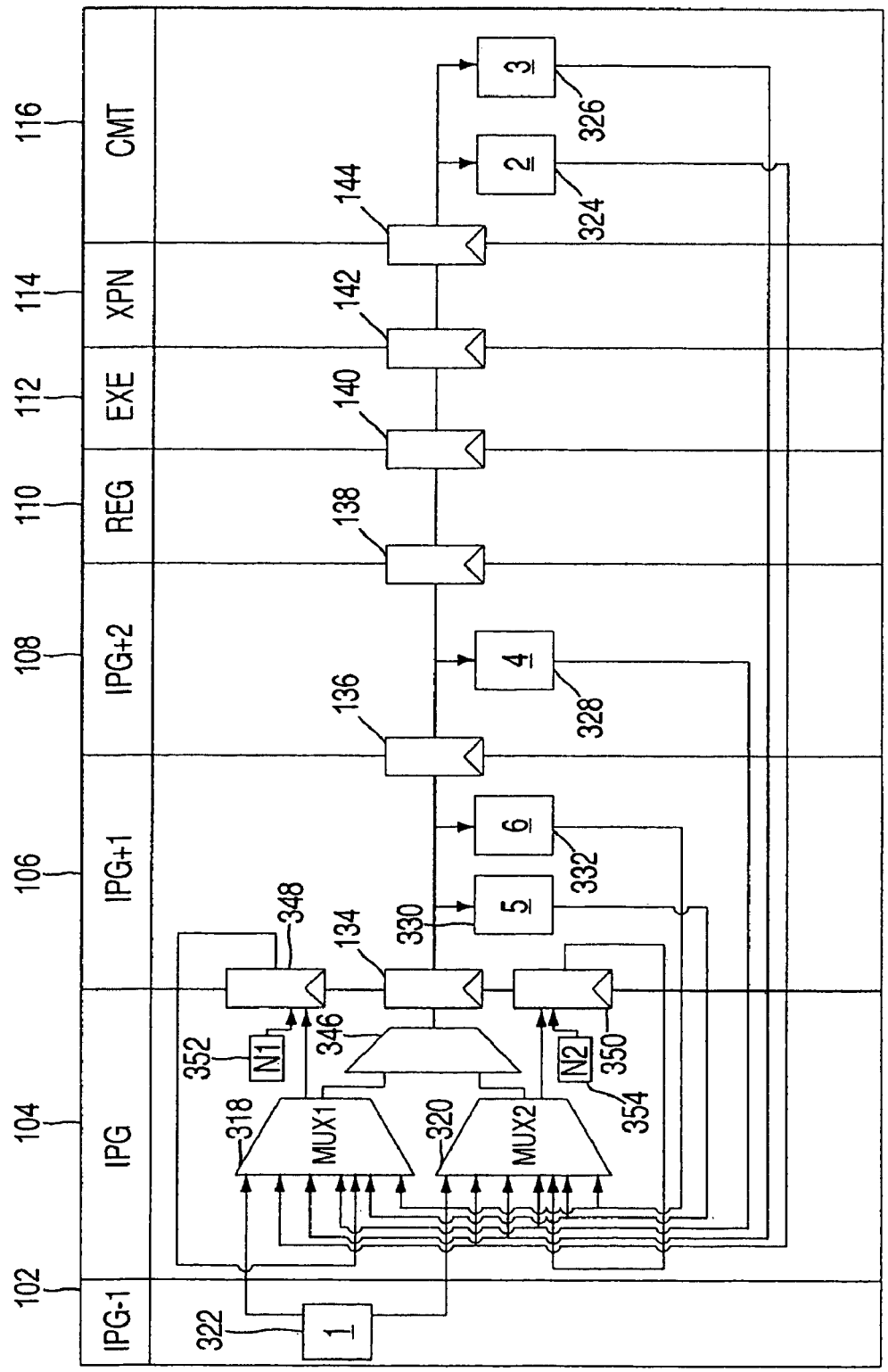
FIG. 3 provides an illustration of an embodiment of the present invention.

FIG. 3 provides an illustration of an embodiment of the present invention. As opposed to storing re-steer information in individual storage elements related to each of the re-steer logic components 324,326,328,330,332, in one embodiment of the present invention, the multiplexer 318 or 320 of the inactive thread operates as if the thread was active. However, instead of the output of the multiplexer being fed to the processor pipeline through the common multiplexer 346, the instruction pointer information of the inactive thread is stored in an 'inactive thread' storage element 348 or 350 to be delivered back into the respective multiplexer 318 or 320 when the thread once again becomes active. In an embodiment of the present invention the inactive thread re-steer storage element 348,350 is a flop with an enable. When the inactive thread once again becomes active, 'inactive thread re-steer' logic 352,354 enables the storage element 348, 350 to release the instruction pointer back into the multiplexer 318, 320. In this embodiment, the inactive thread re-steer is placed at a multiplexer priority between 4 ('1' bubble branch re-steer) and 5 ('0' bubble branch re-steer). The reason for this priority placement is that if the thread at IPG+1 106 differs from that at IPG 104 (changing between active and inactive), '0' bubble branch re-steer 330 and sequential IP 332 would not be utilized (because of the threads changing), and the newly active thread instruction pointer would have been coming from the inactive re-steer storage element (into the multiplexer). Because the '1' bubble branch re-steer 328 was generated a cycle earlier, it has a higher priority than the inactive thread re-steer 352,354. If the thread at JPG 104 is the same as the thread at IPG+1 106, the inactive thread re-steer storage element 348,350 would not be enabled, and both '0' bubble branch re-steer 330 and sequential IP 332 would be possible.

Figure 4:
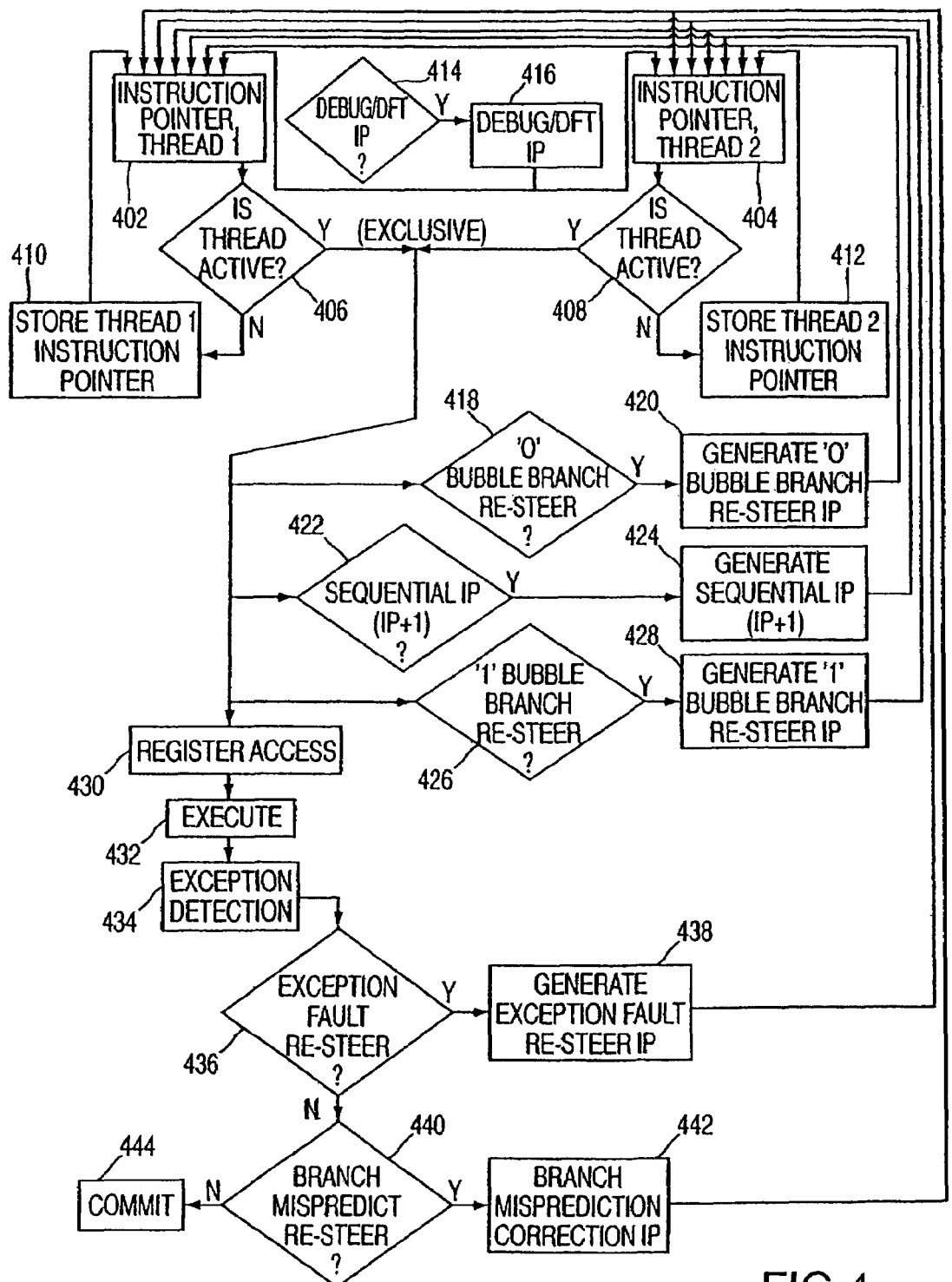
FIG. 4 provides a flowchart for the process of an embodiment of the present invention.

FIG. 4 provides a flowchart for the process of an embodiment of the present invention. In an embodiment of the present invention, at each thread of one or more threads, the highest priority instruction pointer is presented in the processor 402,404. If debug/'design for testability' routines need to be performed 414, the processor is provided an appropriate instruction pointer 416. The system of an embodiment of the present invention checks to see which thread is active 406, 408. In this embodiment, when one thread is active the other(s) must be inactive. In an embodiment, if the thread is inactive, the instruction pointer of that thread is stored in a storage element 410,412. When the thread becomes active again 406,408, different re-steer logic is utilized to change the current instruction pointer to what is appropriate for the circumstances. In an embodiment, the system determines 418 if a '0' bubble branch re-steer is necessary based on past history. If so, an appropriate instruction pointer is generated 420 and provided to the processor 402,404. The system also determines 422 if the instruction pointer should be simply incremented 424 before providing this instruction pointer to the processor 402,404. Also, in an embodiment, the system determines 426 if a '1' bubble branch re-steer is necessary based on past history. If so, an appropriate instruction pointer is generated 428 and provided to the processor 402,404.

In an embodiment, the processor next performs the process of 'register access' 430, where it reads the appropriate values from the registers. The processor then enters the 'execute' stage 432, where it performs the necessary function upon the register values. In an embodiment, the processor then looks to see if an exception was encountered 434. If an exception was encountered 436, an appropriate instruction pointer is generated 438 and provided in the processor 402,404. In an embodiment, the system then looks to see if a branch misprediction occurred 440. If so, an appropriate instruction pointer is generated 442 and provided in the processor 402,404. If there was not a branch misprediction, the value attained by the processor is committed 444.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system comprising:
    a first multiplexer associated with instruction pointers of a first thread;
    a second multiplexer associated with instruction pointers of a second thread;
    a first storage element dedicated to the first multiplexer; and
    a second storage element dedicated to the second multiplexer, wherein
    said first and second multiplexers to provide said instruction pointers of said first and second threads for execution in said processor;
    one of the first and second threads is to be active while the other of said first and second threads is inactive; and
    said instruction pointers for the active thread are to be delivered to processor logic;
    if the first thread is inactive, said instruction pointers for the first thread are to be delivered to the first storage element for delivery to the processor logic if the first thread becomes active; and
    if the second thread is inactive, said instruction pointers for the second thread are to be delivered to the second storage element for delivery to the processor logic if the second thread becomes active.

2. The system of claim 1, further comprising a common multiplexer coupled between said first and second multiplexer and processor logic.

3. The system of claim 2, wherein the common multiplexer is to receive instruction pointer data sequentially from the first multiplexer and the second multiplexer by utilizing a time-multiplexing protocol.

4. The system of claim 3, wherein the time-multiplexing protocol is a 'round-robin' protocol.

5. The system of claim 1, wherein the first multiplexer and the second multiplexer are priority multiplexers.

6. The system of claim 5, wherein the first multiplexer and the second multiplexer are to receive instruction pointer information and data from a plurality of stages in a processor pipeline.

7. The system of claim 6, wherein the first multiplexer and the second multiplexer receive instruction pointer information and data from re-steer logic at the plurality of stages in the processor pipeline.

8. The system of claim 7, wherein the first multiplexer and the second multiplexer are to pass the instruction pointer information and data to the common multiplexer with a pre-determined priority.

9. The system of claim 1, wherein the storage element is a flip-flop device.

10. A method comprising:
    associating a first multiplexer with instruction pointers of a first thread;
    associating a second multiplexer with instruction pointers of a second thread;
    providing, by said first and second multiplexers, said instruction pointers of said first and second threads for execution in said processor;
    dedicating a first storage element to the first multiplexer; and
    dedicating a second storage element to the second multiplexer, wherein
    establishing one of the first and second threads as active and the other of said first and second threads as inactive;
    delivering said instruction pointers for the active thread to processor logic;
    if the first thread is inactive, delivering said instruction pointers for the first thread to the first storage element for delivery to the processor logic if the first thread becomes active; and
    if the second thread is inactive, delivering said instruction pointers for the second thread to the second storage element for delivery to the processor logic if the second thread becomes active.

11. The method of claim 10, further comprising:
    coupling a common multiplexer between said first and second multiplexer and processor logic.

12. The method of claim 11, wherein the common multiplexer receives instruction pointer data sequentially from the first multiplexer and the second multiplexer by utilizing a time-multiplexing protocol.

13. The method of claim 12, wherein the time-multiplexing protocol is a 'round-robin' protocol.

14. The method of claim 10, wherein the first multiplexer and the second multiplexer are priority multiplexers.

15. The method of claim 14, wherein the first multiplexer and the second multiplexer receive instruction pointer information and data from a plurality of stages in a processor pipeline.

16. The method of claim 15, wherein the first multiplexer and the second multiplexer receive instruction pointer information and data from re-steer logic at the plurality of stages in the processor pipeline.

17. The method of claim 16, wherein the first multiplexer and the second multiplexer pass the instruction pointer information and data to the common multiplexer with a pre-determined priority.

18. The method of claim 10, wherein the storage element is a flip-flop device.

19. A system comprising:

a first multiplexer associated with instruction pointers of a first thread;

a second multiplexer associated with instruction pointers of a second thread;

a first storage element dedicated to the first multiplexer; and a second storage element dedicated to the second multiplexer, wherein said first and second multiplexers provide said instruction pointers of said first and second threads for execution in said processor;

one of the first and second threads is to be active while the other of said first and second threads is inactive;

said instruction pointers for the active thread are delivered to processor logic;

if the first thread is inactive, said instruction pointers for the first thread are to be delivered to the first storage element for delivery to the processor logic if the first thread becomes active;

if the second thread is inactive, said instruction pointers for the second thread are to be delivered to the second storage element for delivery to the processor logic if the second thread becomes active; and a common multiplexer coupled between said first and second multiplexer and processor logic that is to receive instruction pointer data sequentially from the first multiplexer and the second multiplexer by utilizing a time-multiplexing protocol.

20. The system of claim 19, wherein the first multiplexer and the second multiplexer are to receive instruction pointer information and data from a plurality of stages in a processor pipeline.

21. The system of claim 20, wherein the first multiplexer and the second multiplexer are to receive instruction pointer information and data from re-steer logic at the plurality of stages in the processor pipeline.

22. The system of claim 19, wherein the first multiplexer and the second multiplexer pass the instruction pointer information and data to the common multiplexer with a pre-determined priority.

* * * * *